(12) United States Patent
Dolev et al.

(10) Patent No.: US 11,595,359 B2
(45) Date of Patent: **\*Feb. 28, 2023**

(54) METHOD FOR ESTABLISHING A SECURE PRIVATE INTERCONNECTION OVER A MULTIPATH NETWORK

(71) Applicant: SECRET DOUBLE OCTOPUS LTD, Tel-Aviv (IL)

(72) Inventors: Shiomi Dolev, Omer (IL); Shimrit Tzur-David, Mevaseret Zion (IL)

(73) Assignee: SECRET DOUBLE OCTOPUS LTD, Tel-Aviv (IL)

( * ) Notice: Subject to any disclaimer, the term of this patent is extended or adjusted under 35 U.S.C. 154(b) by 243 days.

This patent is subject to a terminal disclaimer.

(21) Appl. No.: 16/381,055

(22) Filed: Apr. 11, 2019

(65) Prior Publication Data
US 2019/0306131 A1 Oct. 3, 2019

Related U.S. Application Data

(63) Continuation of application No. 15/311,911, filed as application No. PCT/IL2015/050528 on May 18, 2015, now Pat. No. 10,356,054.
(Continued)

(51) Int. Cl.
*H04L 9/40* (2022.01)
*H04L 9/06* (2006.01)
(Continued)

(52) U.S. Cl.
CPC ........ *H04L 63/0428* (2013.01); *H04L 9/0656* (2013.01); *H04L 9/085* (2013.01);
(Continued)

(58) Field of Classification Search
CPC ... H04L 9/085; H04L 63/0428; H04L 9/0656; H04L 9/0827; H04L 45/24;
(Continued)

(56) References Cited

U.S. PATENT DOCUMENTS

| 4,633,470 A | 12/1986 | Welch et al. |
| 6,182,214 B1 * | 1/2001 | Hardjono ............... H04L 9/085 380/255 |

(Continued)

FOREIGN PATENT DOCUMENTS

| CN | 103190129 | 7/2013 |
| WO | WO 0041357 | 7/2000 |

OTHER PUBLICATIONS

Lou andFang, A Multipath Routing Approach for Secure Data Delivery, IEEE, 2001 (Year: 2001).*

(Continued)

*Primary Examiner* — Khalid M Almaghayreh
(74) *Attorney, Agent, or Firm* — Pearl Cohen Zedek Latzer Baratz LLP

(57) ABSTRACT

A method for establishing a fully private, information secure interconnection between a source and a destination over a data network with at least a portion of a public infrastructure. The method comprising at the source creating n shares of a source data according to a predetermined secret sharing scheme, and encrypting the n shares using (n, k) secret sharing. Further, defining for at least one node vi a directed edge (Vi1, Vi2) that has a k−1 capacity. All outgoing links of vi are connected to vi2. Additionally, using a maximum flow algorithm to define the maximum number of shares outgoing from vi2, and therefore from vi, on each outgoing link. The number of shares forwarded by node vi does not exceed the number of maximum shares that were defined by the maximum flow algorithm.

18 Claims, 7 Drawing Sheets

Related U.S. Application Data

(60) Provisional application No. 62/058,678, filed on Oct. 2, 2014, provisional application No. 62/000,558, filed on May 20, 2014.

(51) Int. Cl.
    *H04L 9/08*     (2006.01)
    *H04L 45/128*   (2022.01)
    *H04L 45/24*    (2022.01)

(52) U.S. Cl.
    CPC ........ *H04L 9/0827* (2013.01); *H04L 45/1287* (2013.01); *H04L 45/24* (2013.01); *H04L 63/0272* (2013.01); *H04L 63/04* (2013.01); *H04L 63/061* (2013.01)

(58) Field of Classification Search
    CPC . H04L 45/1287; H04L 63/0272; H04L 63/04; H04L 63/061; H04L 29/06
    USPC ........ 709/218, 239, 238, 227; 713/160, 162, 713/151–153; 726/14
    See application file for complete search history.

(56) References Cited

U.S. PATENT DOCUMENTS

| | | | | |
|---|---|---|---|---|
| 7,068,790 | B1* | 6/2006 | Elliott | H04L 9/0852 380/278 |
| 8,074,068 | B2* | 12/2011 | Fujii | H04L 9/085 713/160 |
| 8,077,863 | B2* | 12/2011 | Hosaka | H04L 9/085 713/160 |
| 8,111,627 | B2* | 2/2012 | McCallum | H04L 45/28 370/246 |
| 8,255,513 | B2* | 8/2012 | Assa | G06F 16/21 709/224 |
| 8,918,537 | B1* | 12/2014 | Sandstrom | H04L 12/6418 709/224 |
| 9,419,887 | B1* | 8/2016 | Kabbani | H04L 45/12 |
| 9,455,899 | B2* | 9/2016 | DeCusatis | H04L 45/021 |
| 2002/0085565 | A1* | 7/2002 | Ku | H04L 49/252 370/428 |
| 2003/0149869 | A1* | 8/2003 | Gleichauf | H04L 9/0656 713/153 |
| 2004/0013130 | A1* | 1/2004 | Blanchet | H04L 69/16 370/466 |
| 2004/0025018 | A1 | 2/2004 | Haas et al. | |
| 2004/0213229 | A1* | 10/2004 | Chang | H04J 14/0227 370/432 |
| 2006/0280203 | A1* | 12/2006 | Shimokuni | H04L 9/085 370/465 |
| 2007/0036353 | A1* | 2/2007 | Reznik | H04L 63/1441 380/30 |
| 2008/0144836 | A1* | 6/2008 | Sanders | H04L 9/085 380/278 |
| 2009/0067348 | A1* | 3/2009 | Vasseur | H04L 45/50 370/256 |
| 2010/0180280 | A1* | 7/2010 | Chang | G06F 9/5066 718/104 |
| 2012/0163592 | A1 | 6/2012 | Bellare et al. | |
| 2013/0042105 | A1 | 2/2013 | Orsini et al. | |
| 2015/0188949 | A1* | 7/2015 | Mahaffey | H04W 12/37 726/1 |
| 2015/0256448 | A1* | 9/2015 | Xiao | H04L 45/74 370/235 |
| 2016/0219024 | A1* | 7/2016 | Verzun | H04L 9/34 |
| 2017/0017581 | A1* | 1/2017 | Huang | G06F 3/067 |
| 2020/0287931 | A1* | 9/2020 | Gudov | H04L 63/1425 |

OTHER PUBLICATIONS

Wenjing Lou and Y. Fang, "A multipath routing approach for secure data delivery," 2001 MILCOM Proceedings Communications for Network-Centric Operations: Creating the Information Force (Cat. No. 01CH37277), 2001, pp. 1467-1473 vol. 2, doi: 10.1109/MILCOM.2001.986098. (Year: 2001).*

Siguang Chen and Meng Wu, "Secure multipath routing based on secret sharing in mobile ad hoc networks," 2009 IEEE International Conference on Network Infrastructure and Digital Content, 2009, pp. 539-542, doi: 10.1109/ICNIDC.2009.5360929. (Year: 2009).*

Office Action for Chinese Patent Application No. 201580039555X dated Oct. 24, 2019.

Alache et al., "Improving security and performance ot an ad hoc network through a multipath routing strategy", Journal in computer virology, 4(4) 267-278. Dec. 31, 2008. Retrieved from the Internet on Feb. 19, 2019. https://5a9bd01d-a-62cb3a1a-s-sites.googlegroups.com/site/taverniercedric/NET_ART.pdf?attachauth=ANoY7cpnAX iQhOkzb3gdYm2orUfbuHRqSbCjh0TtKrdpxh56cyyU4uJKiejwrnk 4VbkleAhxkzzjudX14NYRRKRJRi_1b4mRFhLgNjWwHWfVK2c uXP4P4pUOhV4CVVBBanSR1Jy7Lih9L30L8yY4MyKsF5DI4sni NJPGmj71e-wa91Zfw12TN_x-USOakJpvVIK3pZun_Sp3reYJYW1lujXHqASNKXbfqA%3D%3D&attredirects=1.

Dinitz, Yefim, "Dinitz' Algorithm: The Original Version and Even's Version", (Theoretical computer science, pp. 218-240, Springer-Verlag, Berlin, Heidelberg, 2006). Retrieved from the Internet on Feb. 19, 2019. https://www.cs.bgu.ac.il/~dinitz/Papers/Dinitz_alg.pdf.

McKeown et al., "OpenFlow: Enabling innovation in campus networks", SIGCOMM Comput, Commun. Rev, 38(2): 69-74, Mar. 2008). Retrieved from the Internet on Feb. 19, 2019. http://ccr.sigcomm.org/online/files/p69-v38n2n-mckeown.pdf.

Shamir, Adi, "How to share a secret", ACM 22 (11), 1979. Retrieved from the Internet on Feb. 19, 2019. https://csjhu.edu/~sdoshi/crypto/papers/shamirturing.pdf.

Wenjing Lou et al: "A multipath routing approach for secure data delivery", Milcom 2001. Proceedngs. Communications for Network-Centric Operations: Creating the information Force. McClean, VA, Oct. 28-30, 2001; [IEEE Military Communications Conference], New York, NY: IEEE, US, vol. 2. Oct. 28, 2001. pp. 1467-1473, XP010579245, DOI: 10.1109/Milcom.2001.986098 ISBN: 97-0-7803-7225-2.

Wenjing Lou et al: "Spread: improving network security by multipath routing", 2003 IEEE Military Comminications Conference. Milcom 2003. Boston, MA, Oct. 13-16, 2003; [IEEE Military Communications Conference], New York, NY; IEEE, US, vol. 2, Oct. 13, 2003, pp. 808-813. XP010698398, DOI: 10.1109/Milcom.2003.1290216 ISBN: 978-0-7803-8140-7.

European Search Report of Application No. EP15796374.5 dated Jan. 17, 2018.

International Search Resort of Application No. PCT/IL2015/050528 dated Sep. 7, 2015.

* cited by examiner

METHOD FOR ESTABLISHING A SECURE PRIVATE INTERCONNECTION OVER A MULTIPATH NETWORK

CROSS REFERENCE TO RELATED APPLICATIONS

This application is a continuation of U.S. patent application Ser. No. 15/311,911, which was filed on Nov. 17, 2016 and which is a National Phase of PCT Application No. PCT/IL2015/050528, filed on May 18, 2015, which claims the benefit of U.S. Provisional Patent Application No. 62/058,678, which was filed on Oct. 2, 2014, and Unites States Provisional Patent Application No. 62/000,558, which was filed on May 20, 2014.

FIELD OF THE INVENTION

The present invention relates to the field of communication networks, such as the Internet. More specifically, the present invention is related to a secret sharing scheme, which is particularly effective for establishing a private channel for two parties communicating over multipath communication over hybrid infrastructures including clouds, servers in Points of Present (PoPs) and backup communication channels. The secret sharing scheme may use fused public directories authentication to replace the secrecy and authenticity provided by the public key infrastructure, for eliminating the need for trusted authority and protection of keys.

BACKGROUND OF THE INVENTION

Public key infrastructure is based on modern cryptography, where the existence of one-way-functions is assumed and such speculated to be one-way-functions are used in practice. The security is based on computational security, rather than the classical information theoretical secure techniques, such as the one-time-pad (a random collection of letters each used at most once to encrypt messages with complete security) that implies unconditional secrecy, in particular, cannot be broken by extensive computation for revealing keys. Beyond the computational security promise, there is a need to avoid man-in-the-middle attacks by authenticating the parties using a trusted authority that authenticates the user and stores keys. In turn, the existence of keys is a target for attacks.

A Virtual Private Network (VPN—a network that uses a public infrastructure, such as the Internet, to provide secure access and ensured privacy through security procedures and tunneling protocols) provides easy access from the cloud into a corporate network and its internal resources. However, the encryption protocols that are used today for establishing a VPN are based on encryption keys (PKI—public key infrastructure). In order to create a secure channel between two entities, the destination must provide the sender a certification of its public key, signed by a trusted Certification Authority (CA). If the sender trusts the certification, the sender uses the public key of the CA to reveal the destination public key and a secure session begins. However, if an intruder steals identification of some entity and provides a certified key to the client, the client may use the intruder's key to encrypt the data (e.g., man-in-the-middle attack MITM). Therefore, one of the vulnerabilities of using PM is identity spoofing that causes the source to use the attacker's key.

Another limitation of existing VPNs is the fact that they are based on computational secured protocols, i.e., with enough computational power, an intruder can reveal the encrypted data. Since the computational power of machines continuously grows over the years, the length of the encryption key must increase in order to maintain the desired level of security. However, increasing the length of the key implies degradation in the performance of the encryption process. In addition, there are many existing hardware devices that do not support this new length of the keys and therefore, there are cases where the encryption is vulnerable at a portion of the channel. Also, there are many attacks from the last few years that succeed to break these protocols even without having the key, such as, the Padding Oracle On Downgraded Legacy Encryption (POODLE) attack, (which is a man-in-the-middle exploit), or "Compression Ratio Info-leak Made Easy" (CRIME) attack, (which is a security exploit against secret web cookies). Moreover, unlike information theoretical secure based protocol, the computational secured protocol is not everlasting and basically, it is just a matter of time for the information to be revealed. As a result of the above limitations, an attacker can sniff the data anywhere in network (in the immediate perimeter, in the close zone e.g., a country, or in the backbone—between countries) and then, or at any time in the future, try to break the encryption.

Cloud computing (a form of distributed computing accessed through the network, with the ability to run a program on many connected computers at the same time) is one of the fastest growing opportunities for enterprises and service providers. Enterprises use the Infrastructure-as-a-Service model (IaaS model—a form of cloud computing that provides virtualized computing resources over the Internet), to build private and public clouds that reduce operating costs and increase the reliability of their critical information systems.

One of the existing solutions is CloudBridge technology presented by Citrix® Systems, Inc. (Fort Lauderdale, Fla., U.S.A.), which provides a unified platform that accelerates applications across public and private networks, resulting in superior application performance and end user experience. CloudBridge connects across third-party public cloud and private networks, thereby offering a platform for cloud-enabling third-party applications. However, the privacy of CloudBridge is achieved using a standard VPN, and therefore, is limited to a computational secured channel.

Secret-sharing is a tool used in many cryptographic protocols. A secret-sharing scheme involves a dealer who has a secret, a set of n parties, and a collection of subsets of k parties. According to a secret-sharing scheme, the dealer distributes shares to the parties such that any subset of k parties can reconstruct the secret from its shares, and any subset with less thank parties cannot reveal any partial information on the secret. Secret-sharing schemes have numerous applications in cryptography and distributed computing including secure information storage, secure multiparty computations, access control and more. However, none of these schemes solve the problem of providing information theoretically secure source-destination communication over several optional paths.

Other prior art solutions deal with security issues that arise when using Software-defined networking (SDN), such as using secure multiparty computation techniques to secure the data in the controller. Another prior art method focuses on the effects of end-to-end encrypted networks on Network Intrusion Detection Systems (NIDS) operations. All data traffic sent to a receiver by a sender must be replicated and forwarded also to a Central IDS (CIDS), i.e., the sender sends the packet to a proxy and the proxy forwards it to the receiver as well as to the CIDS. Each connection is secured by VPN but thus unauthorized network sniffing is prevented. However, proxies are still able to access network packets relayed through them, which may expose the network packets to unwanted scrutiny. In order to ensure confidentiality with respect to the proxies, secret-sharing is used, such that the sender splits the packet to n shares and sends the shares to n proxies, the proxies further send the shares to the receiver and the CIDS. However, since VPN routes may cross common network components, the security of the prior art suggested scheme is essentially identical to the security of VPN.

"SPREAD: Improving Network Security by Multipath Routing" (Lou et al., Military Communications Conference, MILCOM '03, 2003 IEEE, Vol. 2) discloses an end-to-end multipath secure data delivery scheme, secure protocol for reliable data delivery (SPREAD), as a complementary mechanism for the data confidentiality service in the public networks. The confidentiality is improved by forcing the secret sharing principle in the network via multipath routing. With a (T,N) secret sharing scheme, the message to be protected can be divided into N shares such that from any T or more shares, it can easily recover the message, while from any T−1 or less shares, it should be impossible to recover the message. Then the shares are delivered across the network via multiple independent paths. The destination node reconstructs the original message upon receiving T or more shares.

"A MULTIPATH ROUTING APPROACH FOR SECURE DATA DELIVERY" (Lou et al., Military Communications Conference, MILCOM '01, 2001 IEEE, Vol. 2) discloses an approach to enhance data confidentiality when transmitting across insecure networks by taking advantage of the distributed nature of networks such as Internet or wireless networks and combine the secret sharing scheme and multipath routing. With a (T,N) secret sharing scheme, the secure message is divided into N shares such that the message can be easily recovered from any T or more shares, while from any T−1 or less shares, it is computationally impossible to recover the message. Then, the shares are delivered across the network via N different paths using the multipath routing algorithm, where no T or more paths can share a single node. The destination node can reconstruct the original message upon receiving T or more shares. Any intermediate node does not intercept T shares necessary for the message recovery. The algorithm takes path independence, path quantity, as well as path cost into consideration and is able to find sets of node disjoint paths between any source-destination pair.

However, both solutions proposed by Lou et al are not highly performance efficient, since shares must be routed in predetermined totally independent source-to-destination paths, without considering the varying data traffic congestion/restrictions in each node. Therefore, in order to obtain the desired level of security, the performance of packet delivery may be compromised. In addition, there are situations where according to the solutions proposed by Lou et al, it will be impossible to find totally independent source-to-destination paths, while there is an existing solution, in which less than k shares traverse each node in the network. For example, when each of the nodes A and B that are connected to C forward (k−1)/2 of the arriving shares to C, while their other (k−1)/2 are forwarded in different paths and some are merged in other nodes later, resulting in non-independent paths that still fulfill the k−1 restriction.

It is therefore an object of the present invention, to provide an improved and secure VPN solution which is based on data separation scheme that overcomes the security vulnerabilities of the existing VPNs.

It is still an object of the present invention to provide a data separation scheme, for establishing private interconnection between a sender and a receiver, without the need to use encryption keys or trusted third party authorities for achieving security and privacy.

It is another object of the present invention to provide a data separation scheme, which is particularly effective for establishing a private channel, in which the information is information theoretically secure and is not bounded by the security of the VPN used.

It is a further object of the present invention to provide a data separation scheme for establishing a private channel in communication networks, in which the transmitted information cannot be revealed, unless at least k shares are revealed.

It is yet another object of the present invention to provide a data separation scheme, particularly effective for establishing a private channel in the network, which does not require using a Certification Authority for identification to encrypt data communicated between two parties over a data network, even if the data network exploits the internet, public clouds and untrusted channels.

Other objects advantages of the present invention will become clear as the description proceeds.

SUMMARY OF THE INVENTION

The present invention is directed to a method for establishing a fully private, information theoretically secure interconnection between a source and a destination over an unmanaged data network having at least a portion of a public infrastructure. Accordingly, n shares of the source data are created at the source according to a predetermined secret sharing scheme and the shares are sent to the data network, while encrypting the sent data using (n,k) secret sharing. A plurality of intermediating nodes are deployed in different locations over the network, to create a plurality of fully and/or partially independent paths in different directions on the path from the source to the destination, and with sufficient data separation. Then, the shares are sent over the plurality of fully and/or partially independent paths while forcing shares' carrying packets to pass through selected intermediate nodes, such that no router at any intermediating nodes intercepts k or more shares.

The intermediating nodes may include one or more of the following:
Points of Presence (PoPs);
Computational clouds having a dedicated process for forcing shares' carrying packets to pass through selected intermediate nodes, according to a desired routing scheme;
Backup channels and paths.

The portion of the public infrastructure may include alternative paths supplied by the same/different network/Internet providers.

The separation between tunnels belonging to fully and/or partially independent paths may be made by encapsulation of the shares' packets according to a routing scheme that creates at least partially independent routing paths from source to destination, such that no node along a tunnel intercepts k or more shares.

During encapsulation, the header of each share-carrying packet may be changed to a modified header, for forcing the shares' carrying packets to pass through selected nodes, where each packet is forced to pass a possible different subset of selected nodes.

Public clouds deployed over the network may be used as nodes, by embedding a dedicated agent into a plurality of them, such that the modified header (which may be a part of the payload) will determine the next intermediate destination which will be the node that has been elected while creating each modified header.

Whenever the data network has a known topology, the flow may be tested offline, to obtain the distribution of data through different nodes and deploy the dedicated agents accordingly, to create the optimal routing paths.

Whenever the data network has unknown topology a path/topology, recovery tools may be used to obtain the expected distribution of data through different nodes and verify, before sending the share carrying packets.

The path/topology recovery tools may be HP-OpenView, Freenats, Traceroute, TraceMAC or Batctl.

Sufficient data separation may be obtained by dynamically allocating nodes, through which the share carrying packets will pass.

The inherent additional header of IPv6 may be used for creating tunnels between IPv6 nodes, where data between nodes is sent over IPv4 protocol links.

It is possible to encrypt the destination IP address, along with the payload data, by creating n shares from the IP address of the destination and sending the shares via several different paths between pairs of neighboring intermediate nodes, such that the header data is decrypted at each intermediate nodes only by having at least k shares, and any subset of less than k shares cannot be used to decrypt the header data.

Secret shared packets of different length may be created by padding the after secret shared packets with random string of varying lengths, to avoid correlation of packets by a coalition of eavesdroppers. Some of the secret shared packets may be delayed to avoid time correlation.

Data packets may be encrypted by creating a one-time-pad in the background at the sender side; sending the created one-time-pad to the destination over several paths; performing a bitwise XOR operation between the payload data and the bit string of the common one-time-pad; and sending the resulting bits of encrypted payload data over possibly a single channel.

The present invention is also directed to a method for establishing a fully private, information theoretically secure interconnection between a source and a destination over a managed data network having at least a portion of a public infrastructure, comprising the steps of:
- at the source, creating n shares of the source data according to a predetermined secret sharing scheme and sending the shares to the data network, while encrypting the sent data using (n,k) secret sharing;
- using a centralized network controller (such as network controller is a controller for managing an SDN) or network management tools at the sender for dynamically managing a plurality of partially independent paths, over which the shares are routed from the source to the destination, such that the number of shares that pass the router at each node along each path does not exceed a threshold of k−1 shares. Optimal paths are dynamically determined by the network controller/sender, according to the threshold and to the load/current-eavesdropping-coalition-risks on each router in the data network.

The problem of finding paths may be reduced to the maximum flow problem (which may be solved for example, using the Dinitz's algorithm, or one of a plurality of other existing maximum flow algorithms) by expanding the original (directed or undirected) graph representing the data network.

The number of unique paths that are required to apply the (n,k) secret sharing scheme on the network, may be varied by the controller in response to a coalition of two or more routers.

Whenever a coalition of routers is detected/suspected, the sender or the controller may be adapted to merge the nodes of the coalition and to find a flow that fulfills the sharing scheme constraints.

The secret sharing scheme may be implemented on the network's Application Layer by:
- receiving the data before it gets into the networking stack;
- applying secret-sharing on the entire data;
- establishing a connection for each route and sending the shares on different sockets using TCP or UDP, depending on the required service.

The secret sharing scheme may be implemented on the network's Transport Layer by:
- at the source, applying secret-sharing only on the packet's payload, while keeping the headers of the Transport Layer public, while allowing some minor changes, like the length and the checksum;
- at the source, creating n packets with the same headers of all layers;
- at the destination, buffering k out of n shares and applying the secret-sharing algorithm, to reconstruct the original data;
- reconstructing the header of the Transport Layer and sends a single packet (out of the k shares) to the Transport Layer implementation of the destination.

The secret sharing scheme may be implemented on the Network Layer by:
- at the source, applying secret-sharing on the payload and the headers of the Transport Layer, while keeping the headers of the Network Layer public, thereby creating n packets with the same headers of the Data Link and the Network Layers while allowing some minor changes, like length, checksum and CRC).
- at the destination, buffering k out of n shares and applying secret-sharing algorithm to construct the original data;
- sending a single packet (out of the k shares) to the Transport Layer implementation of the destination.

The secret sharing scheme may be implemented on the Data Link layer by applying secret-sharing on the payload and the headers of the Network Layer and Transport Layer, while keeping the headers of the Data Link layer public on the LAN or on a Virtual LAN (VLAN), while allowing some minor changes, like length and CRC).

The secret sharing scheme may be implemented on the Physical Layer by applying secret-sharing on the payload and the headers of the Data Link Layer, Network Layer and Transport Layer, while keeping all headers private.

The secret sharing scheme may be implemented to perform one side identification between a client and a server, without the need to use a key that is certified by a third party, by:
- allowing the client to send a nonce via multiple channels to the server according to the listing of the server in several self-verifiable public directories;
- applying secret-sharing by the client;
- the client receives the server's data from addresses mentioned in the public directory and sends the shares over different separated channels, such that each channel gets a share of the data and only by having all shares or a threshold of the shares, the data can be reconstructed;

the server gets the required number of shares and reconstructs the sent data.

The secret sharing scheme may be implemented to perform double side identification between a client and a server, without the need to use a key that is certified by a third party, using one/two/three handshake protocols, by:

allowing the client to send its ID and a nonce, while each channel gets a share of the data, so that, only by having all or a threshold of the shares, the data can be reconstructed;

the server creates shares from the nonce, receives the client address data from the public directory and sends the shares over different channels;

the server sends its own information with the nonce it got from the client through multiple channels to the client, such that each channel gets only a share of the data;

the client verifies the nonce and gets the server information;

the client verifies the nonce and sends an acknowledgement through different channels to multiple addresses of the server along with the nonce to the server;

the server finalizes the authentication by reconstructing the acknowledgement, and starts a session using one or more channels.

The present invention is further directed to a method for establishing a fully private, information theoretically secure interconnection between a source and a destination over a managed data network having at least a portion of a public infrastructure, comprising:

at the source, creating n shares of the source data according to a predetermined secret sharing scheme and sending the shares to the data network, while encrypting the sent data using n–k secret sharing;

using a centralized network controller for dynamically managing a plurality of partially independent paths, over which the shares are routed from the source to the destination, such that the number of shares that pass the router at each node along each path does not exceed a threshold of k−1 shares.

Optimal paths are dynamically determined by the network controller, according to the threshold and to the load on each router in the data network.

The secret sharing scheme may be hierarchical secret sharing, where at least one secret share is further secret shared by an intermediate network component, and gathered by one of the next components or by the destination.

BRIEF DESCRIPTION OF THE DRAWINGS

In the drawings:

FIG. 2b illustrates the resulting flow and the paths of the different shares on the corresponding expanded graph of FIG. 2a;

DETAILED DESCRIPTION OF THE INVENTION

Figure 1A:
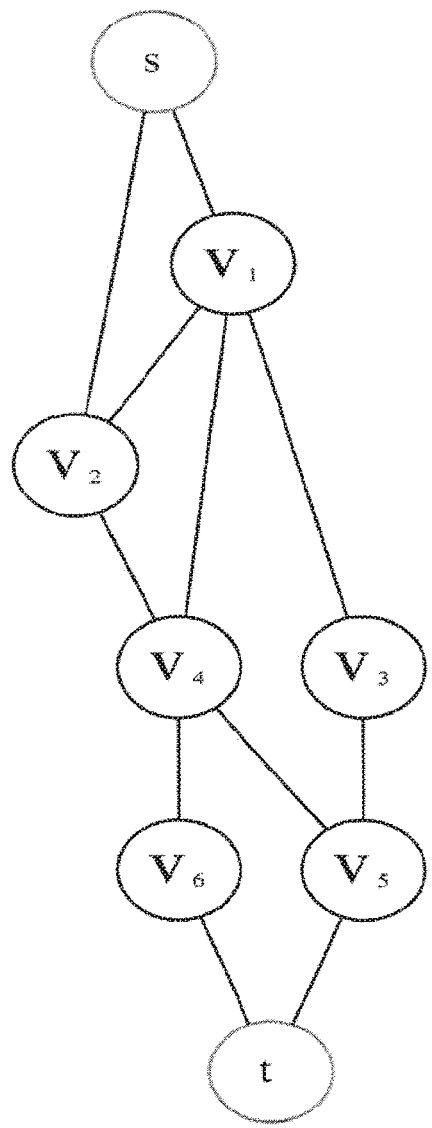
FIGS. 1a and 1b illustrate an original undirected graph and its corresponding expanded graph, respectively.

The present invention proposes a novel alternative for establishing information theoretical secure and private interconnection, which is based on multipath communication that is efficiently implementable by current technology, cloud computing, point-of-presence, backup lines and infrastructures (wired connection, phone, messaging systems, internet, wireless, satellite, etc.) together with social networks and their searchable directories (phone directory, Facebook®, Twitter®, LinkedIn®) for robust authentication and avoidance of identity theft. The present invention uses a data separation scheme for establishing an information theoretically secure private channel in communication networks. In case when a service provider uses a cloud to extend its available services by using virtualized servers on the cloud, the service provider must guarantee the customers that the interconnections between datacenters is private, and therefore, this interconnection is transparent to any potential customer. The proposed interconnection is information theoretic secured, in particular, there is no key that by revealing it, privacy will be compromised.

In one embodiment, the proposed solution uses secret sharing scheme along with different tunnels, to transfer the data while ensuring privacy. Encryption with (n; k) secret sharing scheme (n≥k) is done by creating n shares from the data, such that only by having at least k shares, the data can be decrypted, and any subset of less than k shares cannot be used to decrypt the data. The present invention proposes using a secret sharing scheme (such as Shamir: "How to share a secret", ACM 22 (11), 1979) as a communication infrastructure for indefinitely securing data in transit.

According to the proposed scheme, the source creates n shares from the data and sends them over a data network to the destination through several tunnels, such that no node (router) along a tunnel intercepts k or more shares. This way, only the destination that gets all the shares can decrypt the data, resulting in a private channel between the source and the destination. When n>k, n−k shares can get lost, due to congestion or even by malicious routers. The secret-sharing scheme can be implemented in several communication layers for example, in the Transport Layer, where only the payload of each packet is shared or at the Network Layer, where also the Transport layer headers are shared. This data network can be either unmanaged, such as the current IP network with normal routing or managed (e.g., SDN).

If there are no different routes between the two edges, encapsulation is used (i.e., a special header which forces the packets of the shares to pass via predetermined nodes) to create tunnels. These tunnels are created in different directions on the path from the source to the destination, such that no router intercepts k or more shares.

The appliance/virtual-appliance required for implementing the proposed data separation scheme can easily be integrated into any enterprise environment and is compatible with any communication and/or security infrastructures. The appliance/virtual-appliance is installed inside the enterprise, before the data traffic leaves or enters the enterprise. In order to have multiple paths between the edges, the appliance (or another routing device after it and inside the enterprise) must have at least two interfaces, or routes to another entity along the path with at least two interfaces, to form at least two separate routes between each pair of sites. In any case, there is no effect on current traffic and configuration and the sharing process is transparent to the routers across the paths.

The specific deployment locations of the appliance may vary, depending on several constraints. On the sender side, typically the earliest point where the secret sharing process can be implemented is after the implementation of the upper layer in the networking stack.

The appliance may be installed before or after the existing VPN. By installing it after the VPN on the sender side, it means that the VPN encrypted data is split into shares and reconstructed on the receiver side before sending it to the VPN. Switching locations is also supported, i.e., any share of the appliance/virtual-appliance passes to the VPN to be encrypted.

Example 1: Unmanaged Network

If the data network is unmanaged (like in most cases), the separation between tunnels can be made by encapsulation of the shares' packets according to a routing scheme that creates at least partially independent routing paths from source to destination, along which no node (router) along a tunnel intercepts k or more shares. This is done by changing the headers of each share-carrying packet to a modified header and deploying a plurality of Points of Presence (PoPs—e.g., servers) in different locations (e.g., countries) over the network, and forcing the shares' carrying packets to pass through selected PoPs (which are nodes, as well). Each packet may be forced to pass a possible different subset of selected PoPs. Alternatively or in addition, it is possible to use public clouds that are anyway deployed over the network, as PoPs, by embedding a dedicated agent into many of them. The share carrying packets will be sent from the source to the destination, such that the modified header will determine the next intermediate destination which will be the PoP or cloud agent that has been selected while creating each modified header. Each agent will be able to receive an encapsulated packet (with the modified header), read its destination, encapsulate it by replacing its header with another modified header which corresponds to the next intermediate destination (the next PoP or cloud agent) and send it over the data network to that next intermediate. The modified header may be a part of the payload. This process is repeated until the last PoP or cloud agent sends the packet to the original destination. This way, shares of encrypted data are routed in a controllable manner, thereby creating the required tunnels that force sufficient separation between segments of each path. In any case, each dedicated agent determines only a segment until the next intermediate destination along the path from source to destination.

This routing scheme is superior over the prior art solutions since unlike prior art, it does not require totally independent paths from source to destination. Using encapsulation and PoPs or cloud agents as routing nodes, it is possible to route share carrying packets via many segments, resulting from additional splitting of the paths between intermediate destinations. For example, if n=6 and k=4, it is possible to send 3 packets via one segment and 3 via another segment. It is possible that later some of the first group of 3 packets and the second group will traverse the same node as long as their total number is smaller than 4. Thus, no particular share has an independent path, but still the secrecy is preserved. Also, if one of the nodes of the segments is congested or inactive, it is possible to split the packet delivery to 3 segments, each of which carries 2 packets.

There are cases in which the network in unmanaged but there are more than one VLANs between the source and the destination. In such a case, assuming these VLANs use different routers, it is possible to use the existing VLANs as several paths between the source and the destination.

If the data network is unmanaged but has a known topology, say by network management tools, it is possible to test the flow offline or online at the sender side, in order to obtain the distribution of data through different nodes and deploy/redeploy the dedicated agents (and thereby to determine the PoPs or cloud agent) accordingly, to create the optimal routing paths.

If the data network is unmanaged and has an unknown topology, it is possible to use traceroute (a utility that records the route through the Internet between a source computer and a specified destination computer), or similar tools such as TraceMAC (traceroute for MAC addresses)/Batctl (B.A.T.M.A.N. advanced control and management tool), HP OpenView (a Hewlett Packard product family that consisted of network and systems management products) or the Free Network Automatic Testing System (FreeNATS—is an open source network monitoring software application) in order to obtain the expected distribution of data through different nodes and verify, before sending the share carrying packets, such that no node (router) along a path intercepts k or more shares, regardless the nodes from which they arrive.

According to another embodiment, it is possible to perform dynamic allocation of nodes (dedicated agents or PoPs), through which the share carrying packets will pass, in order to obtain sufficient data separation. For example, 10 agents or PoPs may be deployed at different locations and the initial routing scheme resulting from using traceroute indicated that 6 agents (out of 10) were selected to establish several routing paths with sufficient separation. Then, after sending the shares according to the initial routing scheme (via the initially selected nodes), it is possible to periodically use traceroute to verify if there are unexpected problems (e.g., congestion, delay or temporary inactive router) at one or more nodes along each routing paths. If no problematic node is detected, packets will be sent according to the initial routing scheme. On the other hand, whenever a problematic node is detected, a modified routing scheme will be created dynamically using some other nodes that will be allocated to bypass the problematic node, using another combination of 6 agents or more (out of 10), and packets will be sent according to the modified routing scheme. This process is repeated, until all packets arrive to their destination. This solution may also improve performance, since the router at each node has predetermined routing priority (according to the source or destination of the packet). Therefore, if the share carrying packets are forced to pass via intermediate nodes, some of these intermediate nodes may have improved routing priority. As a result, a proper selection of the intermediate nodes can improve the time it takes the packets to reach their destination. In addition, dynamic path selection may be used to avoid tracing the communication pattern, e.g., packet timing pattern, by sniffers that sniff a subset of the paths.

According to a further embodiment, in case the data network uses an IPv6 protocol (Internet Protocol version 6, in which IP addresses are 128 bits long) it is possible to use the inherent additional header of IPv6 for creating tunnels between IPv6 nodes, where data between nodes can be sent over IPv4 protocol links (Internet Protocol version 4, in which IP addresses are 32 bits long). This tunneling implementation save the overhead involved while performing encapsulation via adding a modified header to the payload.

According to an additional embodiment, when it is required to hide the IP address of the destination of the forwarded data shares, the proposed data sharing scheme may be used to encrypt the destination IP address, along with the payload data. This is done by creating n shares from the IP address of the destination (i.e., the header data) and sending these shares via several different paths between pairs of neighboring intermediate nodes, using the proposed data sharing scheme, such that the header data can be decrypted at each intermediate nodes only by having at least k shares, and any subset of less than k shares cannot be used to decrypt the header data. This way, each intermediate node will collect the shares of the destination, reconstruct the IP address of the destination and add the header to the next intermediate node, until the destination is reached. This additional splitting of the destination IP address (which is essentially similar to tunneling between source and destination) will be made preferably in path segments with higher probability for coalitions of eavesdroppers reducing the possible identification of related packets, and hiding the vicinity of the source/destination from eavesdroppers, which contains much information. Splitting accompanied by secret sharing must be done while preserving the hierarchy according to which each share has been re-split, such that all re-split shares that are collected by an intermediate node will be of the same level (to avoid collision between shares resulting from unequal numbers of re-splitting, which will require more effort to be combined). Each intermediate node can transmit data regarding the splitting level in the hierarchy, to the next intermediate node.

In a similar way, the proposed data sharing scheme may be used to encrypt the source IP address, along with the payload data. This is done by creating n shares from the IP address of the source and sending these shares as part of the payload of the secret shared packet, using the proposed data sharing scheme, such that the real source IP (which is secret shared as part of the payload by the source) will be revealed only by the destination. In this case, the first (or any/every) intermediate node along the path sets itself as the source, in order to forward the shares to the next intermediate node.

The proposed data sharing scheme can be enhanced by creating secret shared packets of different length by padding the after secret shared packets with random string of varying lengths, to avoid correlation of packets by a coalition of eavesdroppers. Also, delaying some of the secret shared packets to avoid time correlation, and even sending some corrupted secret shared packets that can be discarded by the destination that receives enough secret shares but can full the coalition of eavesdroppers.

According to another embodiment, the proposed data sharing scheme may be used to encrypt data packets with restricted latency and deadlines (such as of voice or video packets) that can be influenced and can be more sensitive to synchronization issues that maybe yielded from multiple splitting to secret shares (at the sender) and gathering (at the receiver). In this case, a one-time-pad (being a random bit string) is created in the background at the sender side and is then securely sent to the destination over several paths (using the proposed secret sharing scheme). As a result, only the destination can reconstruct this one-time-pad, in order to be later used to decrypt the received (latency sensitive payload) data that will be sent using (bitwise, bit by bit, XOR, with) the common established one-time-pad. Once the destination has the one-time-pad, the sender performs a bitwise (bit by bit) XOR operation between the payload data and the random bit string (to obtain encryption of the payload data) and sends the resulting bits of encrypted payload data over a single channel (just as it was originally transmitted, with no splitting). Then, the payload data, encrypted by the shared produced one-time-pad, is sent over a single path to the destination, with no additional latency problems. This technique can be used for securely sending movies as well, since no extra latency or reliability problems are introduced, while sending the data from side to side over a single path. The shared one time pad can be also regarded as a shared key when one wants to turn to using computational based schemes.

Example 2: Managed Network

In another embodiment, the method proposed by the present invention suggests using secret sharing in combination with a managed network, such as an SDN, to enable the secret sharing scheme to be managed by the SDN controller. The general idea of the proposed solution is to use SDN to enable the creation of several tunnels between each pair of datacenters that intercommunicate. The source uses a secret sharing technique to encrypt its data and create n shares. In order to reconstruct the data, the destination must have at least k shares out of the n shares that were sent by the sender. The present invention proposes a method for creating these tunnels with the constraint that only less than k shares of the same information can reach a single router. This way, a private and secure interconnection between the datacenters is obtained. In order to ensure this privacy, n–k secret sharing is used to encrypt the data. The source creates n shares of its data and sends them to the network. The SDN controller manages the paths such that no k or more shares pass the same router. This way, the interconnection between the datacenters is information theoretically secured, i.e. unless two or more routers share their data, the encrypted data can never be revealed.

According to the proposed scheme, the problem of finding these paths can be reduced to the maximum flow problem by expanding the original graph. By having a centralized controller or network management tools at the sender, it is possible to compute the flow on the network and determine a bound on the ratio n/k, which is the number of unique paths that are required to apply the n–k secret sharing scheme on the network. Once the flow and the values of n and k are obtained, the sender creates n shares of each packet such that each flow is expanded to n flows where the flow ID is the flow data along with the share index. This way, the controller, which gets the first packet of each flow (corresponding to the new definition of flow), routes the shares to the corresponding paths and the private channel between the datacenters/endpoints is established.

The SDN controller defines the route of each flow that occurs in the data plane. The controller calculates a route for each flow, and adds an entry for that flow in each of the routers along the path. With all complex functions subsumed by the controller, routers simply manage flow tables whose entries can be populated only by the controller. Communication between the controller and the routers uses a standardized protocol and API. Most commonly, this interface is the OpenFlow specification ("OpenFlow: Enabling innovation in campus networks", SIGCOMM Comput. Commun. Rev., 38(2):69-74, March 2008). In an SDN architecture, each router forwards the first packet of a flow to the SDN controller, thereby enabling the controller to decide whether the flow should be added to the router flow table. When a packet of a known flow is encountered, the router forwards it out the appropriate port based on the flow table. The flow table may include some additional information dictated by the controller. With the decoupling of the control and data planes, SDN enables applications and services to deal with a single abstracted network device without concern for the details of how the device operates. Network services see a single API to the controller. Thus, it is possible to quickly create and deploy new applications to coordinate network traffic flow to meet specific enterprise requirements for performance or security.

After creating the n shares, the sender adds an index i, $1 \le i \le n$ to each share, this index becomes a part of the flow id and thus for each original flow, the controller handles n "first" packets of these n initiated flows. Furthermore, each router may have more than one entry but up to k−1 entries for each flow, where k is the threshold of the secret sharing scheme. This index can be added either by adding this field into the matching fields structure in the SDN controller platform which causes a change also at the routers, or to use vendor extensions which allow different kinds of matching. By creating the paths based on the maximum flow algorithm, it is possible to program the controller to route the shares such that no router intercepts k or more shares. In the current example, if $v_{1,1}$ in FIG. 2b gets the first 4 shares then the forwarding table of $v_{5,2}$ may contain the entries at Table I.

TABLE I

Forwarding Table of V5, 2.

| Flow Id | Next Hop |
|---------|----------|
| f1      | v7,      |
| f2      | v7,      |
| f3      | v6,      |
| f4      | v6,      |

There is no limit on the number of packets that go through a single router as long as it does not see k or more packets of the same flow.

A secret-sharing scheme is a method by which a dealer distributes n shares to parties such that only authorized subsets of at least k parties can reconstruct the secret. In this case, when one datacenter intends to communicate with another datacenter, it creates n shares of its message and distributes these shares over the network. The SDN controller routes these shares to the target datacenter in a way that no router on the way intercepts k or more shares. This way, a private channel between the datacenters is established. In this case, k can be equal to n if it is assumed that the channels are reliable and nodes do not omit or corrupt shares. Since only k shares are needed to reconstruct the secret, when n>k, approach similar to forward erasure correcting or error correcting, such as the Berlekamp Welch technique (presented in U.S. Pat. No. 4,633,470 where n is greater than k+2e to withstand e corruptions), can be used to overcome erasures and even corruptions of at most n−k shares.

Example 3: Data Separation Using Main and Backup Channels

Almost any enterprise has a main channel and a backup channel to exchange data, these two channels are totally independent and separated (otherwise the backup channel will not be able to be a real replacement in case the main channel fails). In this case, since there is no mutual segment along each path from source to destination, no node intercepts k or more shares.
Data Separation Problem The problem of data separation between tunnels is examined as graph theory problem. A graph G=(V, E) is given, with a source node s (which has only outgoing flow) and a sink node t (which has only incoming flow). Each node $v \in V$ has a determined non-negative capacity $C_v$. The goal is to push as much flow as possible from s to t in the graph. Each path $p_i$ has a flow $f_{pi}$, the rule is that the sum of the flows of all paths that each node intercepts cannot exceed its capacity, formally, for each node v, $\Sigma p_i | v \in p_i f_{pi} \le C_v$.

Reduction to the Maximum Flow Problem

The problem can be reduced to the known maximum network flow problem where each edge e in E has an associated non-negative capacity $C_e$, where for all non-edges it is implicitly assumed that the capacity is 0. In this problem, the goal is to push as much flow as possible from s to t in G, such that no edge can have flow exceeding its capacity, and for any vertex except s and t, the flow into the vertex must be equal to the flow out from the vertex.

The original graph, G, does not have to be directed. In order to reduce the problem to the maximum flow problem, each vertex v in G is expanded to a directed edge ($v_1$, $v_2$). The expansion process is presented at Algorithm 1:

Algorithm 1: The expansion process

```
Input : G = (V, E), s, t, k − 1
for all u ∈V\u j= s, t do
    V = V\{u}
    V = V ∪ {u1, u2}
    E = E ∪ {(u1, u2)}
    c(u1,u2) = cu
    for all e = (s, v) ∈E do
        E = E\{e}
        E = E ∪ {(s, v1)}
        c(s,v1) = k − 1
    for all e = (u,t) ∈E do
        E = E\{e}
        E = E ∪ {(u2,t)}
        c(u2,t) = k − 1
    for all e = (u, v) ∈E\u j= s, t AND v j= s, t do
        E = E\{e}
        E = E ∪ {(u2, v1)}
        c(u2,v1) = k − 1
        E = E ∪ {(v2, u1)}
        c(v2,u1) = k − 1
```

Figure 2A:
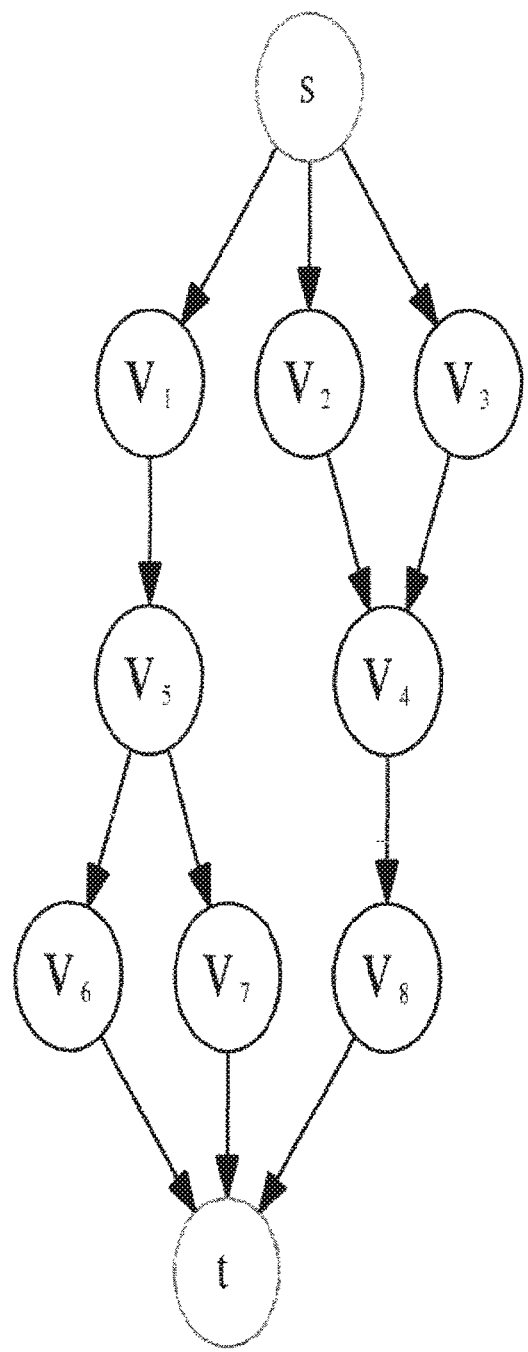
FIG. 2a illustrates an original directed graph G of a flow example.
Figure 2B:
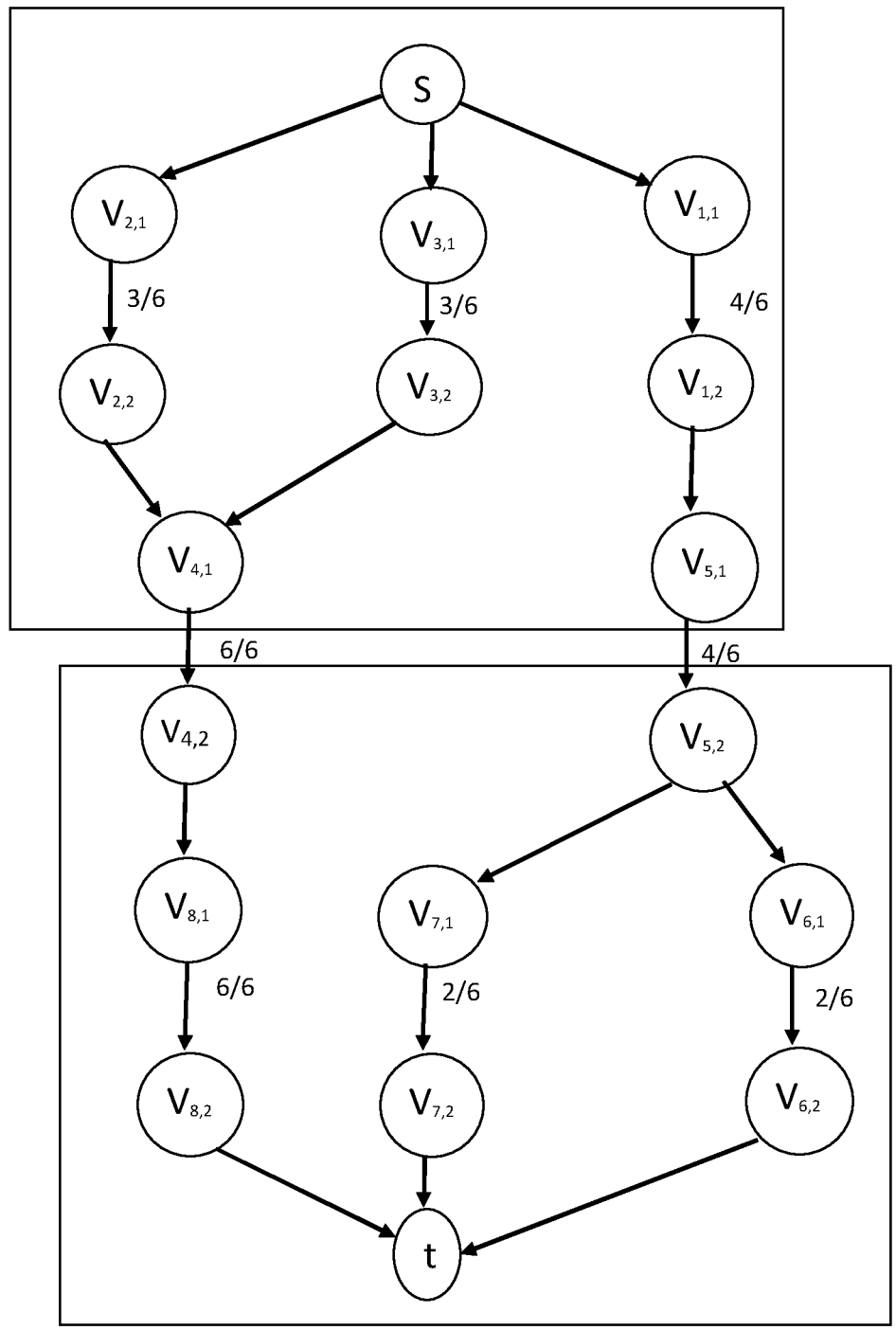
Figure 3:
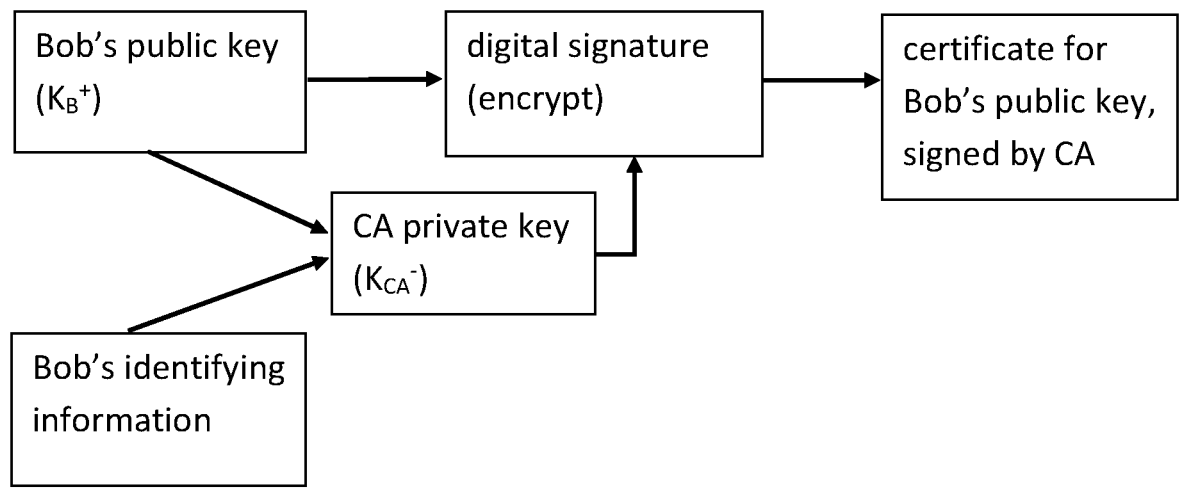
FIG. 3 (prior art) illustrates a conventional process for obtaining a certification from a CA.

FIG. 2a illustrates an original undirected graph G. FIG. 2b illustrates its corresponding expanded graph. The input of the algorithm is the original undirected graph G, the source s and sink t and the threshold k of the secret sharing scheme. At the first step, a directed edge ($v_{i1}$, $v_{i2}$) is added for each vertex $v_i$, in G (except for s and t), for example, ($v_{1,1}$, $v_{1,2}$) in FIG. 2b. The capacity of this new edge is the capacity $Cv_i$ of the vertex $v_i$. Then each edge (s, $v_i$) from the source is replaced by the directed edge (s, $v_{i,1}$) i.e., edges (s, $v_{1,1}$) and (s, $v_{2,1}$) in $v_{5,2}$). Each edge directed to the sink ($v_j$, t) is replaced by ($v_{j,2}$, t), i.e., ($v_{5,2}$, t) and ($v_{6,2}$, t) in FIG. 2b, respectively. Then in case G is undirected, for each other edge ($v_i$, $v_j$) in G, two directed edges, ($v_{i,2}$, $v_{j,1}$) and ($v_{j,2}$, $v_{i,1}$) are added, for example, ($v_{1,2}$, $v_{2,1}$) and ($v_{2,2}$, $v_{1,1}$). In order to eliminate the possibility that edge sniffers will reveal the secret, the capacity of these edges is set to be k−1.

Since the capacity of the nodes in the original graph also represents k−1 edges, all the capacities of all edges are equal. If |V| is the number of vertices and |E| is the number of edges in G, the resulted directed graph, Gt is a graph with (|V|−2)×2+2 vertices and up to (|E|−2)×2+2 edges. The expanded graph Gt is directed to force the paths to include the edges of the expanded vertexes but the input graph can be either directed or undirected. In case of a directed graph, a directed edge $(v_1, v_2)$ is still added for each vertex v, but for each other directed edge $(v_i, v_j)$, only the edge $(v_{i,2}, v_{j,1})$ is added (and not $(v_{j,2}, v_{i,1})$ as was done for an undirected G).

Firstly, the maximum flow problem will be defined. One of the most efficient solutions for that problem has been proposed by "Dinitz' Algorithm: The Original Version and Even's Version", (Theoretical computer science", pages 218-240, Springer-Verlag, Berlin, Heidelberg, 2006). Dinitz's algorithm was selected since it is strongly polynomial. The algorithm uses shortest augmenting paths and its complexity is $O(V^2E)$, under a common assumption is that there are more links than routers. Alternatively, any of the plurality of known maximum flow algorithms can be used, as well.

If G=(V, E) be a network with s, t∈V being the source and the sink of G, respectively. The capacity of an edge is a mapping $c: E \to R^+$, denoted by c(u, v). It represents the maximum amount of flow that can pass through an edge.

A flow is a mapping f: E→R+, denoted by f (u, v), subject to the following two constraints:
1) f (u, v)≤c(u, v), for each (u, v)∈E (capacity constraint: the flow of an edge cannot exceed its capacity).
2) $\Sigma_{u:(u,v) \in E}$ f (u, v)=$\Sigma_{u:(u,v) \in E}$ f (v, u), for each v∈V \{s, t} (conservation of flows: the sum of the flows entering a node must equal the sum of the flows exiting a node, except for the source and the sink nodes).

The value of flow is defined by |f|=Σv:(s,v)∈E f (s, v), where s is the source of G. It represents the amount of flow passing from the source to the sink. The maximum flow problem is to maximize |f|, that is, to route as much flow as possible from s to t.

Dinitz uses few definitions in his solution. The first is the residual capacity, which is computed as $c_f$(u, v)=c(u, v)−f(u, v) and $c_f$(v, u)=f (u, v) for each (u, v) ∈ E; The residual graph is the graph $G_f$=((V, E f), $c_f$|$E_f$, s, t), where $E_f$={(u, v) ∈ V×V:$c_f$(u, v)>0}. The level graph id defined by GL=(V, EL, $c_f$|EL, s, t), where $E_L$={(u, v) ∈ $E_f$:dist(v)=dist(u)+1}. The last definition is dist(v), which is the length of the shortest path from s to v in $G_f$. By using these definitions, Dinitz shows that the maximum flow problem can be solved in $\Theta(V^2E)$. Dinitz approach is used to create the flow. This resulting flow defines the paths over which the shares will be sent.

The maximum flow problem is related to the minimum-cut problem. The problem of s-t minimum cut in a flow network is finding the minimum number of edges in the cut-set that creates a cut where the source and the sink are in different subsets. The cut-set only consists of edges going from the source's side to the sink's side. In other words, if the edges in the cut-set are removed, then flow from the source to the sink is completely cut off. The cut- set value is the sum of the flow capacities in the source- to-sink direction over all of the edges in the cut-set. The minimum cut problem is to find the cut-set that has the minimum cut value over all possible cuts in the network. For any network, having a single source and a single sink, the maximum possible flow from source to sink is equal to the minimum cut value for all cuts in the network. The proof stems from the fact that the maximum flow through a series of linked pipes equals the maximum flow in the smallest pipe in the series, i.e., the flow is limited by the bottleneck pipe.

FIG. 2a illustrates an original directed graph G of a flow example. In order to determine the minimum value of k, the s-t minimum cut is calculated on the expanded graph. If the minimum cut-set contains t edges, then n/k has to be less than t. As seen, the cut-set in this example consists of two edges, $(v_{4,1}, v_{4,2})$ and $(v_{5,1}, v_{5,2})$. This implies that in this graph, n/2 must be lower than k. In this example, n=10 and k=7 were choose, i.e., each router can see at most 6 shares and therefore this is the capacity on the (u1, u2) edges. FIG. 2b illustrates the resulting flow and the paths of the different shares on its corresponding expanded graph.

The method proposed by the present invention considers the network overhead, as well. Each packet that is sent between the source and the destination is split into n shares. Assuming that each share is sent within a packet, n packets are sent for a single packet of data.

If m packets of data should be sent from the source to the destination, n×m packets are sent. This might be considered impractical and a high volume of data is sent in the network in general and in particular between the two nodes. Therefore, if this is the case, the proposed scheme can be used for exchanging keys for the use of standard VPNs. This way, the privacy of the keys is information theoretically secured and man-in-the-middle attacks are eliminated.

By using the (n, k) secret sharing scheme, it is possible evaluate a polynomial of degree k−1 at n points. This polynomial can be expressed as multiple linear operations and it requires O(n) multiplications. In order to recover the packet, the destination uses Lagrange interpolation polynomial with complexity of $O(k^2)$.

The controller operates maximum once for each flow to construct the maximum flow algorithm on the network topology. In practice, it will compute the algorithm only a few times for each couple of source and destination since the network is typically undergo only limited and infrequent dynamic changes. The computational complexity of the controller depends on the network size and it is $O(V^2E)$. In the realistic case where several controllers manage the network where each controller has its own part of the network, this computation can be done in parallel, thus V and E are nodes and edges at each part of the network.

The basic assumptions are that the nodes in the paths do not share their data and that the network is reliably managed by the controller, i.e., the controller can be trusted. If this is not the case, either by a malicious controller or by an adversary that controls the controller, the controller can simply forward all shares to a single router to reveal the secret. In addition to the controller, it is also assumed that the routers (the nodes in the graph notations) behave according to the controller routes. If there is a coalition of two or more nodes, the current solution might fail. Assume that, with probability p, nodes v4 and v5 in FIG. 2a share their data, in that case, they should be considered as one node and therefore the cut-set of the corresponding expanded graph contains only one edge, hence, there is no solution for any n or k. Thus, the probability that there is no solution for private channel is p. On the other hand, if, with probability p, nodes v2 and v3 share their data, then after merging these two nodes, the cut-set contains two edges, which implies that there are two paths from the source to the sink, i.e., the n shares are now sent through two paths.

In the general case, if before merging two nodes in a coalition, the cut-set contains 1 edges, first the number of possibilities to distribute the n shares over the 1 paths with the constraint that each edge in the cut-set intercepts at most k−1 shares should be calculated. This set of possibilities is called Λ. This is equivalent to distributing n balls in £ cells such that no cell contains more than k−1 balls, or by rephrasing, all the possibilities to distribute n balls to the 1 cells minus the possibilities that any of the cells contains k or more balls. The number of possibilities in Λ is:

$$\binom{n+\ell-1}{n} - \ell \times \binom{n-k+l-1}{n-k}. \tag{1}$$

For simplicity, it is assumed that there are no cases in which two or more cells contain k−1 balls, i.e., n<2k−2; this assumption is reasonable since at the end of this analysis, in order to maximize the probability for a private interconnection, the best value for k is n and certainly k>n/2+1. Out of the possibilities in Λ, those that fulfill the constraint that the merged nodes see at most k−1 shares, or with the balls notations, the sum of balls in the two merged cells is less than or equal to k−1 should be found. If it is the sum of balls in the merged cells, then there are 1-2 more cells that each of which can contain up to k−1 balls, thus, the lower bound $t_{1b}$ of t is $$\text{Max}\{n-(\pounds-2)(k-1),0\}, \tag{2}$$

For each possible value of t, the number of possibilities of distributing t balls in the two merged cells times the number of possibilities to distribute the other n−t balls in the other £−2 cells must be calculated. Formally $$\sum_{t_{lb} \leq t \leq k-1} \binom{t+1}{t} \times \binom{n-t+\ell-3}{n-t}. \tag{3}$$

Therefore, the probability for a private interconnect in the general case is given by:

$$p \times \frac{\sum_{t_{lb} \leq t \leq k-1}(t+1) \times \binom{n-t+\ell-3}{n-t}}{\binom{n+\ell-1}{n} - \ell \times \binom{n-k+l-1}{n-k}} + (1-p) \tag{4}$$

By choosing n=k and large n, this probability tends to 1. For example, if n=k=10 and l=3, then $t_{1b}$=1 and the probability to get a private interconnection is given by:

$$p \times \frac{\sum_{1 \leq t \leq 9}(t+1) \times \binom{10-t}{10-t}}{\binom{12}{10} - 3 \times \binom{2}{0}} + (1-p) =$$

$$p \times \frac{\sum_{1 \leq t \leq 9}(t+1)}{63} + (1-p) = p \times 54/66 + (1-p) = 1 - 0.182p$$

For n=k=20, the probability becomes 1−0.0833p. If the sender knows about the possibility of a specific coalition and the probability to find a flow given that coalition is positive, it can first merge the nodes of the coalition and then find a flow that fulfills the sharing scheme constraints. The above analysis was done for a single coalition of two nodes, in case there are more nodes in the coalition or another coalition, the same process can be done recursively.

At mentioned above, the time computation of the secret sharing scheme depends on n and k. Therefore, when there is full trust on the routers, n and k should be relatively low. In order to increase the probability of a private channel, in case there is some positive probability for a coalition in the network, the source may choose larger n and k, even in the price of compromising the algorithm efficiency.

Implementation on OSI Layers

According to another embodiment, the proposed secret sharing scheme may be implemented on different layers of the Open Systems Interconnection (OSI) model. This allows a system to communicate over different communication layer that perfectly secure the data in transit over a communication link.

Implementation on the Application Layer (which Handles the Communication with the User):

In this implementation, the data to be shared are the application layer packets, before splitting the data into packets. The proposed secret sharing process on the source receives the data before it gets into the networking stack implementation. At the first step, the process applies the secret-sharing algorithm on the entire data. At the next step, it establishes a connection for each route and sends the shares on the different sockets (endpoints in a communication flow). In this case, the process can use either Transmission Control Protocol (TCP) or User Datagram Protocol (UDP—a communications protocol that offers a limited amount of service when messages are exchanged between computers in a network that uses the Internet Protocol), depending on the required service. The receiver should maintain several sockets to get different shares, this time after the networking stack is done with the packets. The process reconstructs the original data at the application.

When the packets traverse the network, there is no way to identify that the payload contains split data. This process is transparent to the Data Link layer, the Network layer and the Transport layer implementation on both the sender and the receiver sides.

Implementation on the Transport Layer (which Handles the Data Exchange Between Parties and Reliability):

In this implementation, the data to be shared is only the payload, while keeping the headers of the Transport layer public. First, the process on the source gets the packet before it leaves. Then, it applies the secret-sharing algorithm on the payload, while creating n packets with the same headers of all layers (Data Link layer, the Network layer and the Transport layer). Since the routers on the way of the packets traversing the network do not process the payload at any time, the proposed secret sharing process is transparent to them.

The proposed secret sharing process on the destination gets the packets when they enter the local network (before they reach the destination on the Transport Layer implementation), first the secret sharing process buffers k out of n shares and applies the secret-sharing algorithm, to reconstruct the original data. Then the secret sharing process adds the headers of the Transport Layer and sends a single packet (out of the k shares) to the Transport Layer implementation of the destination. This secret sharing process is also transparent to the Transport layer implementation on both the sender and the receiver sides. The implementation on the Transport Layer does not interfere with any device that inspects the packet headers at all levels, such as a firewall or a conventional VPN. In case where a device such as an Intrusion Detection System (IDS) is part of the route (that examines the packet payload), the IDS should be located before splitting into shares on the sender side and after it, on the receiver side (again, in the same place where a VPN is located).

Implementation on the Network Layer (which Handles Routing and Data Transfer Between Sides):

In this implementation, the data to be shared is the packets of the Transport Layer, i.e., the payload and the headers of the Transport Layer, while keeping the headers of the Network Layer public. The proposed secret sharing process on the source gets the packet before it leaves, and applies the secret-sharing algorithm on the payload and the headers of the Transport Layer. The process creates n packets with the same headers of Data Link and the Network Layers.

When the packets traverse the network, since the routers on the way do not process the headers of the Transport Layer, the process is transparent to them.

The process on the destination gets the packets when they enter the local network (again, before they reach the destination in the Transport Layer implementation). It buffers k out of n shares and applies the secret-sharing algorithm, to construct the original data. Here, the data already contains the headers of the Transport Layer. Then it sends a single packet (out of the k shares) to the Transport Layer implementation of the destination. The proposed secret sharing process is also transparent to the Transport Layer implementation, both at the sender and the receiver sides.

The implementation on the Network Layer is made right after the OS finishes the implementation of the Network layer and on the transport layer, and also interferes devices that inspect the headers of the transport layer, such as a firewall. In this case, the splitting process should be after the firewall or it should bypass the firewall, exactly as it happens today when a VPN and a firewall listen to the same port. Implementation on the Data Link Layer (which Handles Point to Point Data Transfer in Spite of Noise and Distortions):

In this implementation, the data to be shared is the Network Layer's packets, i.e., the payload and the headers of the Network Layer and Transport Layer, while keeping the headers of the Data Link layer public.

There are two architectures to implement the proposed secret sharing process on the Data Link architecture is on the LAN, and the other is on a Virtual LAN (VLAN).

When implemented on the LAN, the network should be in a graph structure, rather than tree structure, namely, there are two or more paths for connecting between host A and host B. In order to find the multiple paths, it is possible to execute the proposed flow algorithm in the LAN. Then, after splitting the data, the source sends the shares through more than one switch to the destination.

When implemented on a VLAN, there is a protocol that encapsulates the headers of the Network Layer, for example Multiprotocol Label Switching (MPLS—a mechanism that directs data from one network node to the next node, based on short path labels rather than long network addresses). The routing in the VLAN is done through several switches by the Data Link layer protocol (sometimes is considered as layer 2.5). This protocol creates tunnels in the Network Layer, so using the Network Layer, the source and destination in the VLAN are in the same LAN. The proposed secret sharing process can be applied by creating multiple tunnels between the source and the destination.

Implementation on the Physical Layer (which Handles Signal Transmission, Voltages and Connections)

In this implementation, the data to be shared is the Data Link packets, i.e., the payload and the headers of the Data Link Layer, Network Layer and Transport Layer, while keeping all headers private. This can be done by separating the physical bandwidth, for example, by splitting light waves and sending the shares at the different waves.

In additionally to the above constraints, it is possible to implement the proposed secret sharing process anywhere at the source and the destination with the following additional limitations:

At the sender side, for each level, the earliest point where the process can be implemented is after the implementation of the above layer in the networking stack. For example, the Network Layer implementation can be implemented right after the OS completes the implementation of the transmission layer in the networking stack. In any case, it can be right before the packet leaves the network. With the same constraints for the receiver, it can be the first step when the packets enter the network or just before the above layer implementation, in the above example, it should be right before the implementation of the transmission layer in the networking stack.

In case there are devices such as VPN, Intrusion Detection System (IDS—a device or application that analyzes whole packets, both header and payload, looking for known events) or a firewall, the Application Layer and Transport Layer layers implementation does not interfere any device that examines the packet headers at all levels such as firewall or VPN. In case a device such as IDS (that examines the packet's payload) is on the way, the IDS should be before the split into shares at the sender side and after it, at the receiver side (again, at the same place where a VPN is located).

The Physical layer, Data Link layer and Network Layer implementation includes also devices that examine Transport Layer and Network Layer headers, such as a firewall. In this case, the splitting process should be after the firewall or it should bypass the firewall, exactly as happens today when the VPN and the firewall are installed on the same port.

Figure 1B:
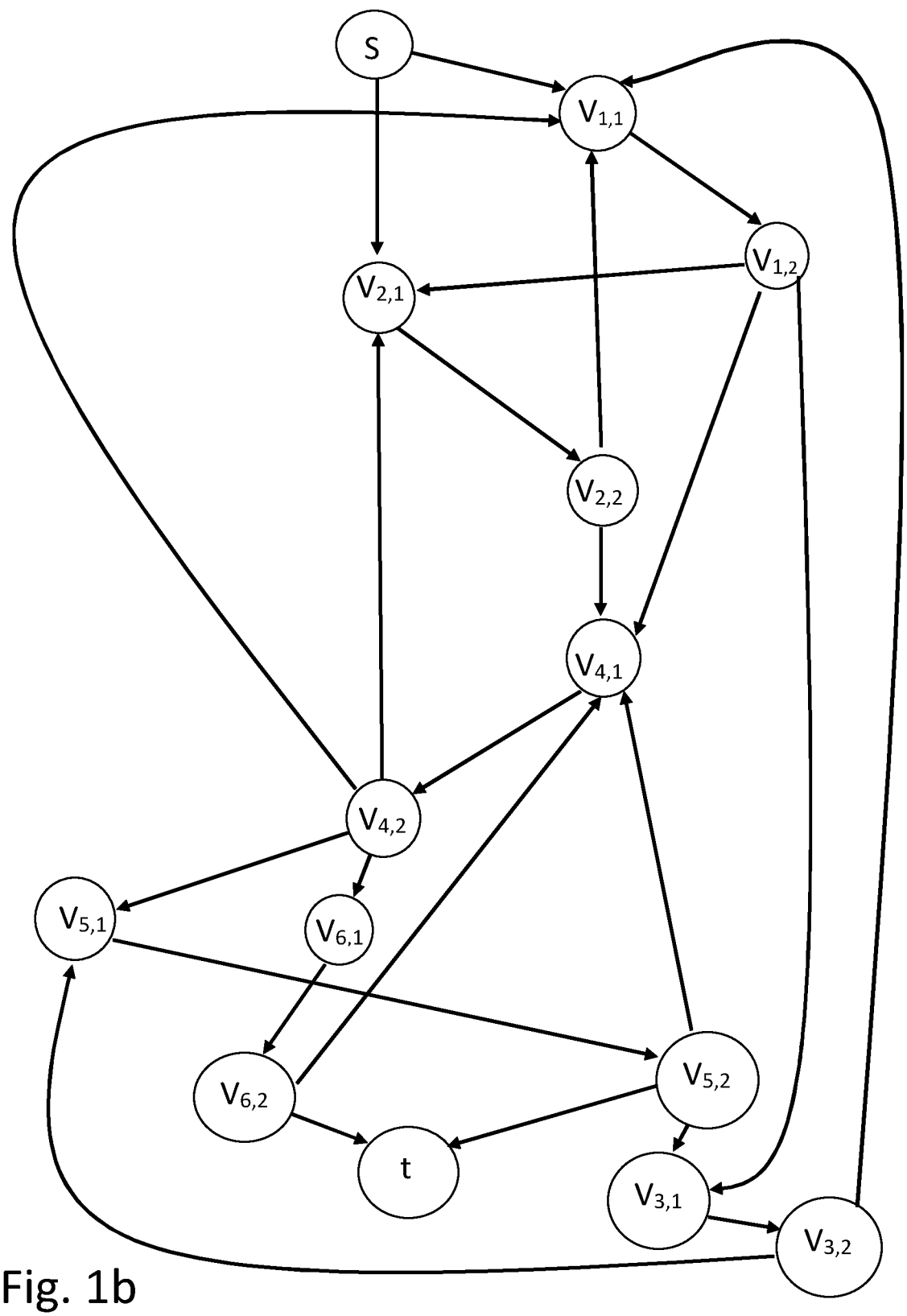

According to another embodiment, it is possible to employ the proposed secret sharing scheme, or a random string sharing scheme, to perform identification between a client and a server, without the need to use a key that is certified by a third party. Today, identification (to authenticate two parties) is done by having a public key certified by a Certification Authority (CA). Each entity has two keys, a public key and a private key. The public key is used to decrypt data by the other party and the private key is used to decrypt it. For authentication purposes, data that was encrypted by a private key, can be decrypted by a public key. The conventional process for obtaining a certification from a CA on a public key is illustrated in FIG. 1. At the first step, the CA 10 receives from one party a public key 11 along with the party's identifying data 12. The CA 10 signs the public key 11 using its private key 13 and issues a certificate 14 for that public key 11. The browser or the other party already possesses the public key of the CA and consequently can verify the signature, trust the certificate and the public key in it. Since the first party uses a public key that the CA certifies, a fake first party can only use the same public key. Since the fake first party does not know the corresponding private key, it cannot create the signature needed to verify its authenticity.

For example, if a server requires that a client will send some private data (e.g., a password), it needs to authenticate itself to the client. Normally, the server does that by using a service of one of the CAs (such as Verisign, Reston, Va., U.S.A.). The CA identifies the server and uses its private key to sign the server's identification and public key. By having the public key certified by a CA, the server is authenticated to the client. The client uses the public key of the CA to reveal the server public key. There are two main problems with this authentication process, one is the need to trust a CA and the other is the strength of the encryption. Today, anyone (benign or possibly malicious entity) can establish a CA and in practice, this is the situation in many cases. The browser does alert the client if it gets a certification from unknown CA but the typical client would simply press the "OK" button to continue. This is a major vulnerability that can be solved using the proposed secret sharing scheme. Furthermore, in many cases the strength of the identification depends on some password that the client chooses. As was proven many times, in many of the cases, these passwords are easy to guess.

By using the secret sharing scheme proposed by the present invention, such a guessing will become much harder. The new identification process proposed by the present invention does not require using any certificates or certificate authorities. Instead, it creates several separated channels (tunnels) between communicating parties, along with some of the public information of entities in the Internet. In addition, in order to identify using the secret sharing scheme of the present invention, a user must have at least two (logical or preferably also actual) networking paths (and/or applications) where the user can get data in, for example, email, Facebook®, LinkedIn®, SMS, etc. (this collection is sometimes called a "public trust", where publicly available identity information is used for authentication, as a redundancy for a trusted authority). The main idea of the new identification process is that one side sends some data through these (at least logically) separated channels to the other side and by having all (or some threshold of) the pieces of the data, the other side can construct the data, find the details on the entity that proposes the connection and verify it.

The new identification process proposed by the present invention can have one side authentication or both sides authentication.

One Side Authentication

Figure 4A:
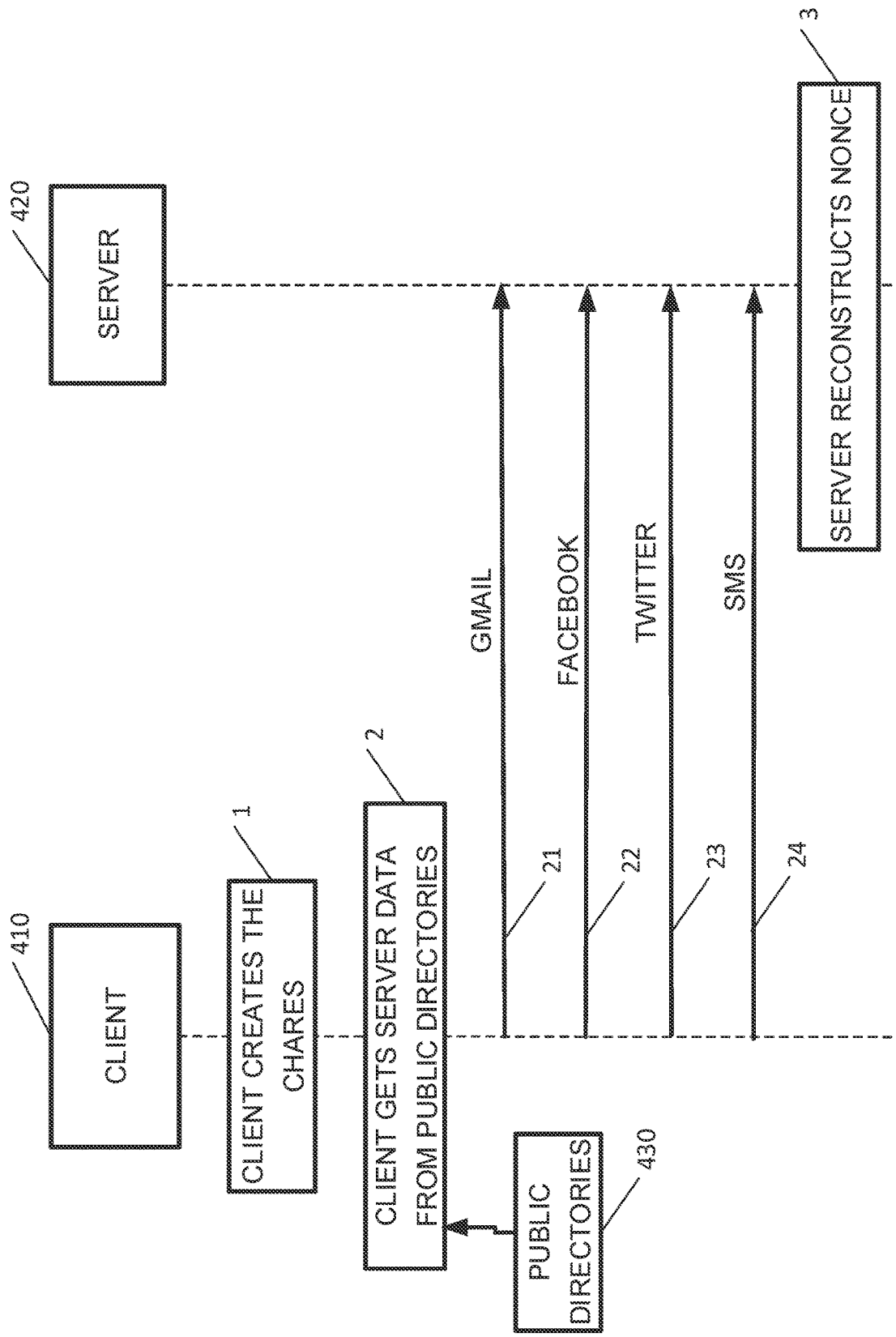
FIG. 4a illustrates a process of one side authentication, using the secret sharing scheme proposed by the present invention.

If it is only required to authenticate a server 420 to a client 410, the one side authentication process will include the following steps (which are illustrated in FIG. 4a):

At the first step, the client 410 takes the following actions to send some message or/and nonce (a random number generated for a specific use, such as session authentication) together with its own identification information via multiple channels to the server 420 according to the listing of the server 420 in several (self-verifiable) public directories 430 (e.g., a phone directory, email, Facebook®, Twitter®, LinkedIn® searches, government agencies, newspaper, IP address, etc.). A self-verifiable public directory 430 is a public directory which essentially can withstand identity-theft attempts. Each entity in a self-verifiable public directory 430 can verify its own details, so as to make sure that the data representing these details is up-to-date and has not been corrupted by a $3^{rd}$ party. Otherwise, the self-verifiable public directory 430 will notify the public directory's 430 moderator that the data is not up-to-date. The data is secret shared 1 by the client 410. Next step the client 410 received 2 the server's 420 data from the addresses mentioned in public directory 430 and sends the shares over different separated channels 21, 22, 23, 24, such that each channel gets a share of the data and only by having all (or a threshold of the) shares, the data can be reconstructed. The data may include all the found listing information so that the server 420 may identify its own wrong listing in some of the directories, as a result of non-updated listing or phishing. At the next step, the server 420 gets the required number of shares and reconstructs 3 the client's nonce. At that step the server 420 receives the message of the client 410, and the client 410 has succeeded sending the message to the server 420 in a secure fashion, in this "one-way authenticated" version the server 420 does not send the identifier of the client 410 over multiple channels.

Double Sides Authentication

Figure 4B:
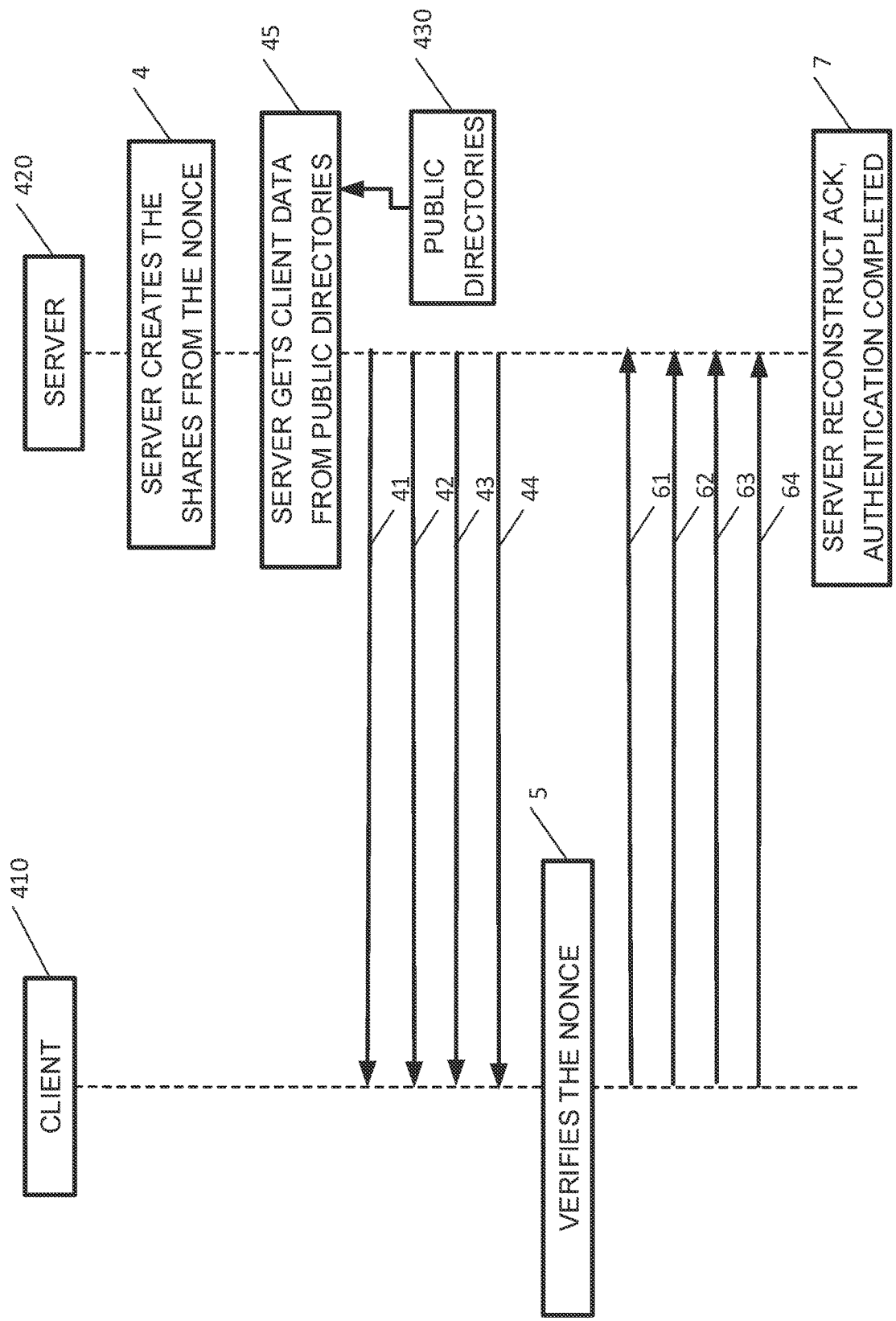
FIG. 4b illustrates a process of double side authentication, using the secret sharing scheme proposed by the present invention.

If it is required that both sides will authenticate themselves, the client 410 side will perform the steps described before (for one side authentication). In turn, the double side authentication process will further include the following steps (which are illustrated in FIG. 4b):

At the first step, the client 410 sends its ID and some nonce (a number generated for a specific use, such as session authentication) via multiple public accounts of the server 420 over multiple channels, such that each channel gets a share of the data and only by having all (or a threshold of the) shares, the data can be reconstructed. The data may include all the found listing information so that the server 420 may identify its own wrong listing in some of the directories, as a result of non-updated listing or phishing. Again, each channel gets a share of the data, so that, only by having all (or a threshold of the) shares, the data can be reconstructed. The server 420 creates shares from the nonce received 4, possibly augmenting the nonce with a new nonce, and its own ID information, searches 45 the client data in the public directories 430 and sends the shares over different channels 41, 42, 43, 44. At the next step, the client 410 verifies the nonce 5 and gets the server 420 information. At the next step, the client 410 sends an acknowledgement through the different channels 61, 62, 63, 64 to multiple addresses of the server 420 along with the nonce (or with a combination, such as bitwise XOR of the two nonce, when the server replies with a new nonce) to the server 420. At the next step, the server 420 finalizes the authentication 7 by reconstructing the acknowledgement, and, in case also confidentiality is required, starts a session using multiple channels (using the agreed IP addresses that are part of the identification information), possibly using the nonce as a (first) common shared secret or a seed for creating sequence numbers for the shares. One/two/three way handshake procedures based on using public directories 430 and secret shares sent by multi-path communication are essentially the core of the proposed authentication schemes.

It should be indicated that using a public trust may be sometimes vulnerable to phishing and identity stealing attempts. Such vulnerabilities may be overcome by using a self-authentication process, during which an entity (e.g., a bank) periodically performs self-searches of its own public contact details in all public directories (in the same way that other entities search these public directories), to ensure that there is no identity theft (by comparing the search results to its authentic public contact details). Once an identity detects a mismatch in a public directory (i.e., a stolen or fake identity), it issues an alert to that public directory to block access to it. The frequency of performing these self-searches is normally increased if the risk level increases.

The secret sharing scheme proposed by the present invention can overcome some levels of identity theft, by using error correction algorithms. In this case, even if an intruder cracked one of the public directories (e.g., LinkedIn®) and sends fake identity data, it will be still possible to reconstruct the nonce by using error correction algorithms, such as the Berlekamp Welch technique. This may be done by finding a polynomial in which one or more points (up to a threshold e) are incorrect, but is still revocable by the redundancy implied by n>k.

According to another embodiment, instead of using a secret sharing the proposed solution may use other data separation schemes. For example, it is possible to select a sequence of bits (a coding sequence) with the same length as of the data sequence and decode and encode the data sequence by performing a logic operation (such as XOR) between the two sequences. Then, the resulting (encoded) bit sequence and the coding sequence are sent to the destination via separate tunnels. This way, only the destination (which receives the full sequences will be able to decode the data sequence and reveal the data by performing another XOR operation. Such a solution also keeps the size of the sent packets the same as the original packet's size. According to another example, it is possible to encode the data sequence using Reed-Solomon code and send segments of the coded sequence via to the destination via separate tunnels. This way, only the destination (which receives the full sequences will be able to decode the data sequence and reveal the data by decoding it with the same Reed-Solomon code.

The solution proposed by the present invention may be used to protect selected systems in an enterprise, such as emails or other types of data, rather than protecting the entire data traffic that is sent from, or received by, the enterprise.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method of establishing a secured interconnection between a source and a destination over a data network having at least a portion of a public infrastructure, comprising:
 a) at said source, creating n shares of a source data, wherein reconstructing the source data requires at least k shares out of the created n shares, and associating each share with a flow;
 b) defining, for at least one node vi, a directed edge (vi1, vi2), wherein all outgoing links of vi are connected to vi2;
 c) setting a capacity constraint of the directed edge (vi1, vi2) to be k−1 flows; and
 d) creating paths using a maximum flow algorithm under the capacity constraint, wherein a separation between tunnels belonging to fully and/or partially independent paths is made by encapsulation of packets of the shares according to a routing scheme that creates at least partially independent routing paths from said source to said destination, such that no node along a tunnel intercepts k or more shares.

2. The method according to claim 1, wherein the data network includes a plurality of intermediating nodes creating a plurality of fully and/or partially independent paths in different directions on the path from said source to said destination, the method comprising:
 forcing shares' carrying packets to pass through selected intermediate nodes, such that no router at any intermediating nodes intercepts k or more shares, wherein the intermediating nodes include one or more of the following:
 Points of Presence (PoPs);
 Computational clouds having a dedicated for forcing shares' carrying packets to pass through selected intermediate nodes, according to a desired routing scheme;
 Backup channels and paths.

3. The method according to claim 1, wherein the portion of the public infrastructure includes alternative paths supplied by one or more network service providers.

4. The method according to claim 1, wherein during said encapsulation, a header of each share-carrying packet is changed to a modified header, for forcing the shares' carrying packets to pass through selected nodes.

5. The method according to claim 4, wherein each packet is forced to pass a different subset of selected nodes.

6. The method according to claim 4, further comprising using public clouds deployed over the data network as nodes, by embedding a dedicated agent into a plurality of them, such that the modified header will determine the next intermediate destination which will be a node that has been elected while creating each modified header.

7. The method according to claim 6, wherein the modified header is a part of a payload.

8. The method according to claim 1, wherein when the data network has a known topology, the flow is tested offline, to obtain a distribution of data through different nodes and deploy dedicated agents accordingly, to create optimal routing paths.

9. The method according to claim 1, wherein whenever the data network has unknown topology a path/topology recovery tools are used to obtain an expected distribution of data through different nodes and verify, before sending share carrying packets.

10. The method according to claim 9, wherein the path/topology recovery tools are selected from the group of:
 HP-OpenView;
 Freenats;
 Traceroute;
 TraceMAC;
 Batctl.

11. The method according to claim 1, wherein sufficient data separation is obtained by dynamically allocating nodes, through which share carrying packets will pass.

12. The method according to claim 1, wherein an inherent additional header of Internet Protocol Version 6 (IPv6) is used for creating tunnels between IPv6 nodes, where data between nodes is sent over Ipv4 protocol Internet Protocol Version 4 (IPv4) links.

13. The method according to claim 1, further comprising encrypting a destination Internet Protocol address, along with a payload data, by:
 creating n shares from the IP address of the destination; and
 sending said shares via several different paths between pairs of neighboring intermediate nodes, such that a header data is decrypted at each intermediate node only by having at least k shares, and any subset of less than k shares cannot be used to decrypt the header data.

14. The method according to claim 1, further comprising creating secret shared packets of different length by padding the after secret shared packets with random string of varying lengths, to avoid correlation of packets by a coalition of eavesdroppers.

15. The method according to claim 14, further comprising delaying some of the secret shared packets to avoid time correlation.

16. The method according to claim 1, further comprising:
 encrypting data packets with long payloads by creating a one-time-pad in the background at the source side;
 sending the created one-time-pad to the destination over several paths;
 performing a bitwise XOR operation between the payload data and the bit string of said created one-time-pad; and sending the resulting bits of encrypted payload data over a single channel.

17. A method for establishing a secured interconnection between a source and a destination over a managed data network having at least a portion of a public infrastructure, comprising:
    a) at said source, creating n shares of a source data, wherein reconstructing the source data requires at least k shares out of the created n shares, sending said at least k shares to said data network, and associating each share with a flow; and
    b) using at least one of: a known topology of the data network, a centralized network controller and a network management tool at the source, to:
        according to a result of applying a maximum flow algorithm over a graph with at least one directed edge having a capacity constraint to intercept k--1 flows defined for at least one node, dynamically forward each share from said source to said destination, such that the number of shares that pass a router at each node does not exceed a threshold of k−1 shares,
        creating paths using the maximum flow algorithm under the capacity constraint, wherein an optimal routing of the shares is dynamically determined by said centralized network controller, according to said threshold and according to a load or current-eavesdropping-coalition-risks on each router in said data network,
        wherein a separation between tunnels belonging to fully and/or partially independent paths is made by encapsulation of packets of the shares according to a routing scheme that creates at least partially independent routing paths from said source to said destination, such that no node along a tunnel intercepts k or more shares.

18. A system comprising:

a memory; and a controller configured to establish a secure interconnection between a source and a destination over a data network having at least a portion of a public infrastructure, by:
    a) at said source, creating n shares of a source data, wherein reconstructing the source data requires at least k shares out of the created n shares, and associating each share with a flow;
    b) defining, for at least one node vi, a directed edge (vi1, vi2) wherein all outgoing links of vi are connected to vi2;
    c) setting a capacity constraint of the directed edge (vi1, vi2) to be k−1 flows;
    d) creating paths using a maximum flow algorithm under the capacity constraint, wherein a separation between tunnels belonging to fully and/or partially independent paths is made by encapsulation of packets of the shares according to a routing scheme that creates at least partially independent routing paths from said source to said destination, such that no node along a tunnel intercepts k or more shares.

* * * * *